US009687985B2

(12) United States Patent
Ueno et al.

(10) Patent No.: US 9,687,985 B2
(45) Date of Patent: Jun. 27, 2017

(54) ROBOT HAND HAVING WORKPIECE POSITIONING FUNCTION, ROBOT SYSTEM, AND METHOD OF POSITIONING AND GRIPPING WORKPIECE

(71) Applicant: FANUC CORPORATION, Minamitsuru-gun, Yamanashi (JP)

(72) Inventors: Takanobu Ueno, Yamanashi (JP); Takashi Itsukaichi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/638,465

(22) Filed: Mar. 4, 2015

(65) Prior Publication Data

US 2015/0251320 A1    Sep. 10, 2015

(30) Foreign Application Priority Data

Mar. 6, 2014 (JP) ................................. 2014-043880

(51) Int. Cl.
*B25J 15/06* (2006.01)
*B25J 15/00* (2006.01)

(52) U.S. Cl.
CPC ....... *B25J 15/0616* (2013.01); *B25J 15/0052* (2013.01)

(58) Field of Classification Search
CPC ........................ B25J 15/0052; B25J 15/0616
USPC ............................ 414/684.3, 749.6; 29/407.1
See application file for complete search history.

(56) References Cited

U.S. PATENT DOCUMENTS

| 3,601,396 A * | 8/1971 | Rovin ................ A41H 43/0207 271/194 |
| 2002/0152598 A1* | 10/2002 | Sarh .......................... B21J 15/10 29/418 |
| 2007/0033790 A1* | 2/2007 | Tsuchiya ................ B62D 65/02 29/407.1 |
| 2009/0092472 A1* | 4/2009 | Luo ...................... B65G 47/911 414/752.1 |
| 2010/0024190 A1* | 2/2010 | Vontz ................... B25J 15/0052 29/428 |
| 2011/0176900 A1 | 7/2011 | Hsieh et al. |
| 2014/0261962 A1 | 9/2014 | Sawatzky et al. |

FOREIGN PATENT DOCUMENTS

| JP | 526284 U | 4/1993 |
| JP | 572386 U | 10/1993 |
| JP | 06-182689 A | 7/1994 |
| JP | 951029 A | 2/1997 |

(Continued)

*Primary Examiner* — Gerald McClain
*Assistant Examiner* — Ronald Jarrett
(74) *Attorney, Agent, or Firm* — RatnerPrestia

(57) ABSTRACT

The robot hand of the present invention comprises: a first abutting part which projects from a main body part in Z-direction, and has a first abutting surface against which a first surface of the workpiece abuts; second and third abutting parts which extend from the main body part, and against which the second and third surfaces of the workpiece abut respectively; and a suction member which is attached to the main body part so as to hold by suction the first surface. The suction member is deformable into an elongated shape where the suction surface is located in front of the first abutting surface in Z-direction, and into a contracted shape where the suction surface is located in back of the first abutting surface in Z-direction.

4 Claims, 10 Drawing Sheets

(56) References Cited

FOREIGN PATENT DOCUMENTS

| JP | 11124230 A | 5/1999 |
| JP | 2000191334 A | 7/2000 |
| JP | 2010530339 A | 9/2010 |
| JP | 2010253568 A | 11/2010 |
| JP | 2013248695 A | 12/2013 |
| JP | 2016513592 A | 5/2016 |

\* cited by examiner

ROBOT HAND HAVING WORKPIECE POSITIONING FUNCTION, ROBOT SYSTEM, AND METHOD OF POSITIONING AND GRIPPING WORKPIECE

BACKGROUND OF THE INVENTION

1. Field of the Invention

The present invention relates to a robot hand which has a workpiece positioning function, a robot system, and a method of positioning and gripping a workpiece.

2. Description of the Related Art

When using various industrial robots to convey a workpiece, it is preferable that the workpiece should be gripped by the robot hand which is attached to the front end part of the arm, after being positioned in an accurate manner. In relation to this, JP-A-H6-182689 proposes the technique of using a positioning guide which is provided at a robot hand to guide the workpiece to be gripped to a regular position with respect to the hand. More specifically, the robot hand of JP-A-H6-182689 is provided with a suction head which can hold the workpiece so that it can be moved in the horizontal direction, and a cylinder which drives the suction head in ascending/descending directions, and is configured to lift the workpiece being held by the suction head so that it abuts against the guide, for the purpose of positioning. In this respect, the robot hand of JP-A-H6-182689 requires a mechanism for holding the workpiece so as to allow its movement in the horizontal direction, and a power source for driving the cylinder in ascending/descending directions, and therefore the robot hand becomes larger in dimensions and the manufacturing cost ends up increasing. Further, the robot hand of JP-A-H6-182689 uses the drive force of the cylinder to make the workpiece abut against a guide, and therefore the workpiece is liable to be deformed along with positioning.

A robot hand which is capable of accurately positioning and griping a workpiece without causing a deformation in the workpiece is being sought.

SUMMARY OF INVENTION

According to a first aspect of the present invention, there is provided a suction-type robot hand for gripping a workpiece which has a mutually intersecting first surface, second surface, and third surface, comprising: a main body part; a first abutting part which projects from the main body part, and has a first abutting surface against which the first surface of the workpiece abuts, at the front end part in the projecting direction; a second abutting part which extends from the main body part, and against which the second surface of the workpiece abuts; a third abutting part which extends from the main body part, and against which the third surface of the workpiece abuts; and a suction member which is attached to the main body part, and has a suction surface which can hold by suction the first surface of the workpiece, wherein the suction member projects from the main body part in the same direction as the first abutting part and has a suction surface at the front end part in the projecting direction, and the suction member is deformable into an elongated shape where the suction surface is located in front of the first abutting surface in the projecting direction, and into a contracted shape where the suction surface is located in back of the first abutting surface in the projecting direction.

According to a second aspect of the invention, there is provided a robot hand in the first aspect, wherein when the suction surface faces downward in the gravity direction, the suction member is deformed into the elongated shape due to its own weight, and when the suction surface (AS) faces upward in the gravity direction, the suction member is deformed into the contracted shape due to its own weight.

According to a third aspect of the present invention, there is provided a robot system comprising a robot hand in the first or second aspect, and a robot arm which can change a position and posture of the robot hand.

According to a fourth aspect of the invention, there is provided a method of positioning and gripping the workpiece with respect to the robot hand in the robot system in the third aspect, comprising: holding by the suction member, the first surface of the workpiece which faces upward in the gravity direction; changing a position and posture of the robot hand which holds by suction the workpiece, so that the first surface faces downward in the direction of gravity, and thereby making the workpiece drop down by gravity so that the first surface abuts against the first abutting surface; releasing suctioning of the workpiece by the suction member; further changing a position and posture of the robot hand so that the first abutting surface becomes slanted with respect to the horizontal direction, and thereby making the workpiece slide by gravity along the first abutting surface so that the second surface and the third surface abut against the second abutting part and the third abutting part respectively; and again holding by the suction member, the first surface of the workpiece in the state where the second surface and the third surface abut against the second abutting part and the third abutting part respectively.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
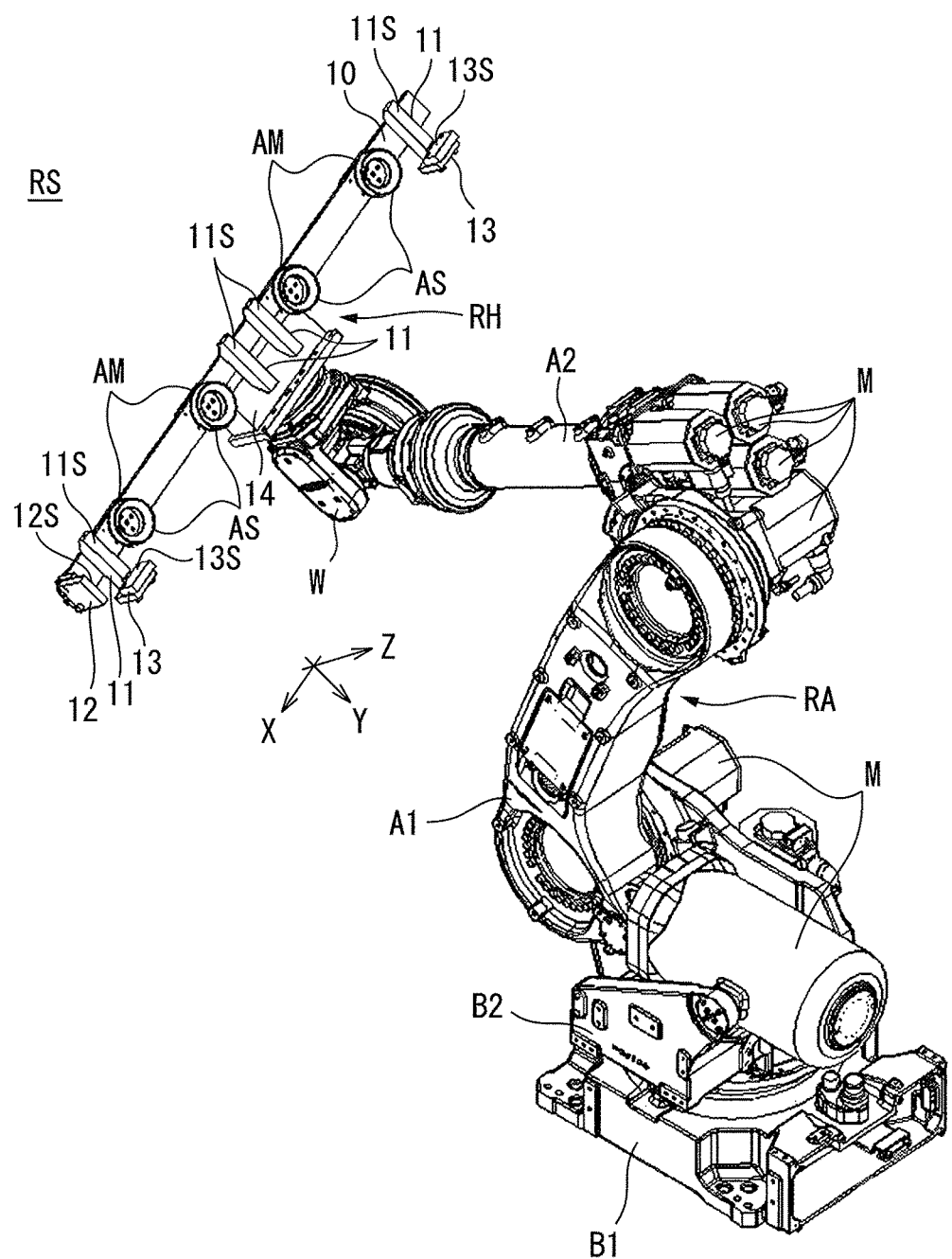
FIG. 1 is a perspective view of a robot system comprising a robot hand of an embodiment of the present invention, and shows the state where the robot hand has not yet gripped a workpiece.

Referring to FIG. 1 to FIG. 12, a robot system comprising a robot hand of one embodiment of the present invention will be explained. The robot system of the present embodiment is a conveyor system for conveying various workpieces, for example, finished or unfinished components on an automated production line, by operating the robot hand and robot arm. FIG. 1 is a perspective view of an illustrative robot system RS which comprises the robot hand of the present embodiment. As shown in FIG. 1, the robot system RS of the present example comprises a robot arm RA which has a wrist part W, and a robot hand RH which is attached to the wrist part W.

As shown in FIG. 1, the robot arm RA of the present example comprises a stationary base B1 which is fixed on a floor surface, a swivel base B2 which is connected to the stationary base B1, a lower arm part A1 which is connected to the swivel base B2, an upper arm A2 which is connected to the lower arm part A1, and a wrist part W which is connected with the upper arm part A2. Further, the robot arm RA of the present example is configured to change the position and posture of the robot hand RH attached to the wrist part W by mean of the drive forces of a plurality of servo motors M for operating the above parts. FIG. 1 illustrates a six-axis vertical articulated robot which is provided with six servo motors M, but the number of axes of the robot arm RA of the present embodiment is not limited to this.

Figure 2:
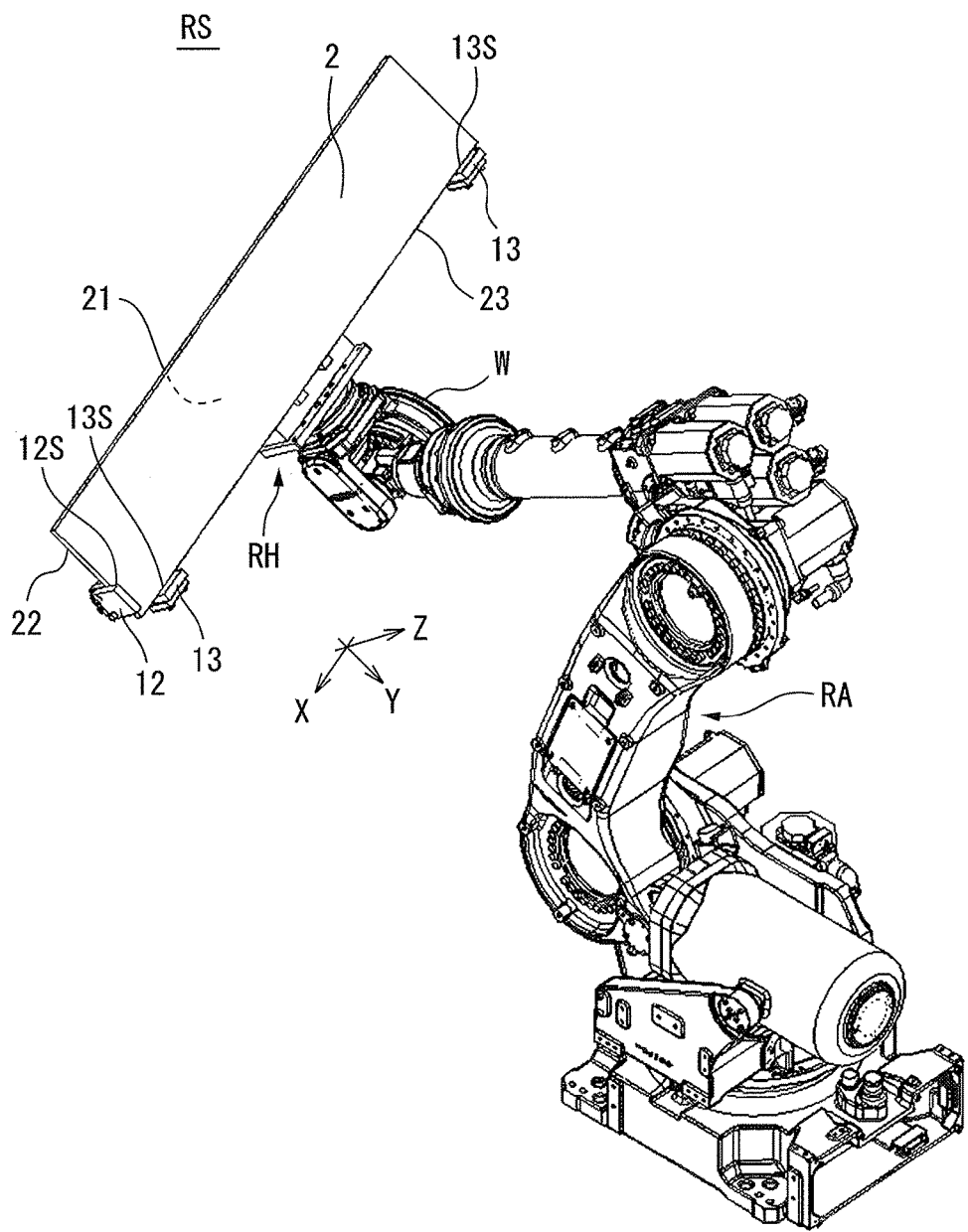
FIG. 2 is a perspective view of a robot system comprising a robot hand of an embodiment of the present invention, and shows the state where the robot hand already positioned and gripped a workpiece.

Further, the robot hand RH of the present example is a suction-type robot hand which holds various workpieces by suction and has the function of three-dimensionally positioning a workpiece to be gripped in cooperation with the robot arm RA. FIG. 2 is a perspective view similar to FIG. 1 and shows the state after the robot hand RH positions and grips the workpiece 2. As shown in FIG. 2, the workpiece 2 to be gripped by the robot hand RH of the present embodiment has a mutually intersecting first surface 21, second surface 22, and third surface 23. In particular, the workpiece 2 which is illustrated in FIG. 2 has a flat plate shape which extends in one direction. Further, the workpiece 2 of the present example has a first surface 21 and third surface 23 which are parallel to the extension direction of the flat plate and are intersecting with each other, and a second surface 22 which is vertical to the extension direction of the flat plate and perpendicularly intersects with both the first surface 21 and third surface 23.

Referring again to FIG. 1, the robot hand RH of the present example comprises a flat plate shaped main body part 10 which extends in one direction, and first abutting parts 11 which project from the main body part 10. The first abutting parts 11 of the present example have first abutting surfaces 11S against which the first surface 21 of the workpiece 2 can abut. In the following explanation, for convenience, the extension direction of the main body part 10 will be referred to as the "X-direction". Further, the robot hand RH of the present example comprises a second abutting part 12 which extends from the main body part 10. The second abutting part 12 of the present example has a second abutting surface 12S against which the first surface 21 of the workpiece 2 can abut. Further, the robot hand RH of the present example comprises a third abutting part 13 which extends from the main body part 10. The third abutting part 13 of the present example has a third abutting surface 13S against which the third surface 23 of the workpiece 2 can abut. Furthermore, the robot hand RH of the present example comprises suction members AM which project from the main body part 10 in the same direction as the first abutting parts 11. The suction members AM of the present example have suction surfaces AS which can hold the first surface 21 of the workpiece 2 by suction.

As shown in FIG. 1, the robot hand RH of the present example comprises four first abutting parts 11 which are arranged along the X-direction. Each of these first abutting parts 11 projects perpendicularly to the X-direction from one surface on the main body part 10. Further, the first abutting surfaces 11S of the present example are provided at the front end parts in the projecting direction of the first abutting parts 11. In the following explanation, for convenience, the projecting direction of the first abutting parts 11 is referred to as the "Z-direction", while the direction vertical to both the X-direction and Z-direction is referred to as the "Y-direction". As shown in FIG. 1, two among the four first abutting parts 11 are arranged at the center part in the X-direction of the main body part 10, while the remaining two are arranged one each at the vicinities of the two end parts in the X-direction of the main body part 10. Below, the former first abutting parts 11 may be referred to as the "first abutting parts 11 at the center", while the latter first abutting parts 11 may be referred to as the "first abutting parts 11 at the sides". Note that, the robot hand RH of the present example comprises a mount part 14 which extends from the surface of the main body part 10 which is opposed to the surface where the first abutting parts 11 are provided. The mount part 14 of the robot hand RH of the present example is mounted to the wrist part W of the robot arm RA.

As shown in FIG. 1, the robot hand RH of the present example comprises a single second abutting part 12 which extends in the Z-direction from the front end part in the X-direction of the main body part 10. The second abutting surface 12S of the present example is provided at the side surface of the second abutting part 12 which faces backward in the X-direction. Further, the robot hand RH of the present example comprises two third abutting parts 13 which are arranged along the X-direction. Each of these third abutting parts 13 extends from the main body part 10 through the intermediary of the above-mentioned first abutting part 11 at the side. More specifically, each of the third abutting parts 13 of the present example projects in the Z-direction from the front end parts in the Y-direction of the first abutting part 11 at the side. Further, the third abutting surface 13S of the present example is provided at the side surface of each third abutting part 13 which faces backward in the Y-direction. The first surface 21, second surface 22, and third surface 23 of the workpiece 2 of the present example perpendicularly intersect with each other, and therefore the first abutting surface 11S, second abutting surface 12S, and third abutting surface 13S against which these surfaces can abut also perpendicularly intersect with each other.

Figure 3:
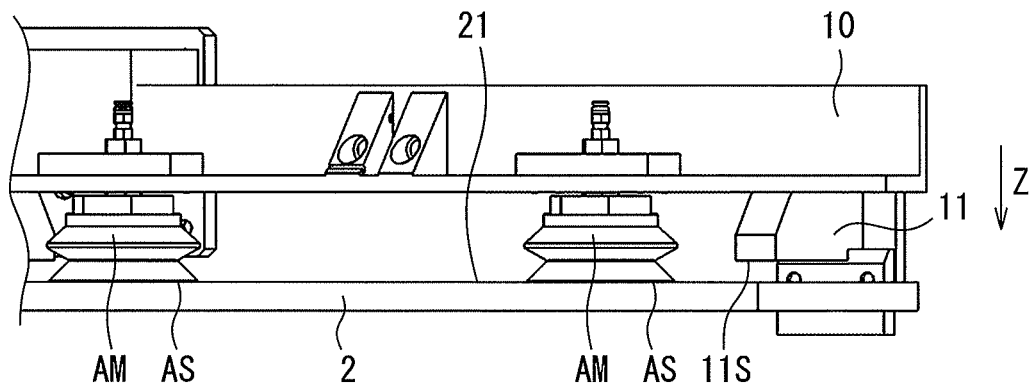
FIG. 3 is a partial enlarged view of a robot hand in FIG. 1, and shows the state where suction members have not yet held a workpiece by suction.
Figure 4:
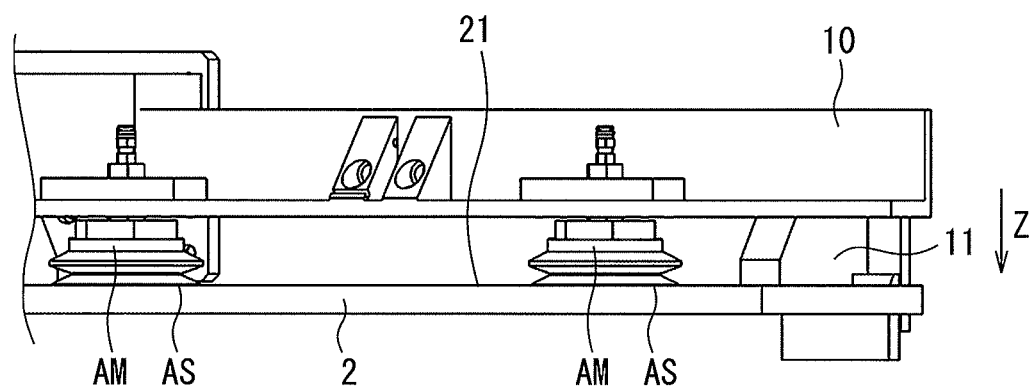
FIG. 4 is a partial enlarged view of a robot hand in FIG. 1, and shows the state where suction members already held a workpiece by suction.

As shown in FIG. 1, the robot hand RH of the present example comprises four suction members AM which are arranged in the X-direction. Each of these suction members AM projects in the Z-direction from the surface of the main body part 10 where the first abutting parts 11 are provided. More specifically, two of the four suction members AM are arranged between one of the above-mentioned first abutting parts 11 at the sides and the adjoining first abutting part 11 at the center, while the remaining two are arranged between the other of the first abutting parts 11 at the sides and the adjoining first abutting part 11 at the center. Further, the suction surface AS of the present example is provided at the front end part in the projecting direction of each suction member AM. FIG. 3 and FIG. 4 are partial enlarged views which show the two mutually adjoining suction members AM and their vicinities in the robot hand RH of FIG. 1. In FIG. 3 and FIG. 4, for convenience, the position and posture of the robot hand RH were already changed so that the suction surfaces AS face downward in the gravity direction.

As shown in FIG. 3 and FIG. 4, the suction members AM of the present example are suction cups which are formed from various elastic materials. Negative pressure which is supplied from a vacuum supply source (not shown) such as a vacuum pump or other, and the first surface 21 of the workpiece 2 is held by vacuum at the suction surfaces AS. More specifically, if negative pressure is supplied from the vacuum supply source, vacuum states are formed inside of the suction members AM, and thus suction forces are generated in directions from the suction surfaces AS toward the inside of the suction members AM. Due to the suction forces generated in this way, the first surface 21 of the workpiece 2 is held by suction at the suction surfaces AS. FIG. 3 shows the state where the suction members AM have not yet held the workpiece 2 by suction, while FIG. 4 shows the state where the suction members AM already held the workpiece by suction. As will be understood from a comparison of FIG. 3 and FIG. 4, the suction members AM of the present example have extensible structures so as to change in dimensions in the projection direction, that is, in the Z-direction. More specifically, the suction members AM of the present example take on elongated shapes in the Z-direction until they hold the workpiece 2 by suction (see FIG. 3). Such shapes may be referred to below as the "elongated shapes". As shown in FIG. 3, when the suction members AM take on such elongated shapes, the suction surfaces AS are located in front of the first abutting surfaces 11S in the Z-direction. In particular, the suction members AM of the present example can be deformed into the elongated shapes by their own weight when the suction surfaces AS face downward in the gravity direction. On the other hand, if vacuum states are formed inside of the suction members AM so as to hold the workpiece 2 by suction, the suction members AM can be deformed into contracted shapes in the Z-direction (see FIG. 4).

Figure 5:
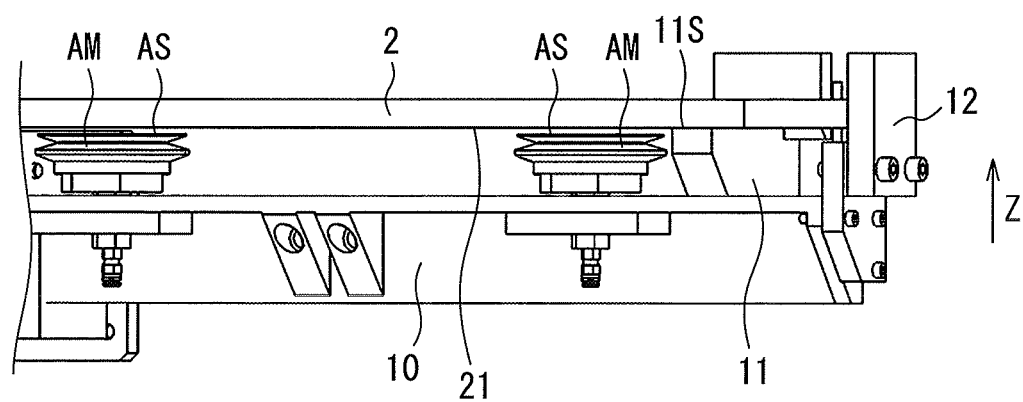
FIG. 5 is a partial enlarged view similar to FIG. 4, and shows a state where a suction surface faces upward in the gravity direction.

Next, FIG. 5 is a partial enlarged view similar to FIG. 4 and shows the state where the suction surfaces AS face upward in the gravity direction. However, in FIG. 5, it is assumed that the suctioning of the workpiece 2 by the suction members AM has been released. If the suctioning of the workpiece 2 is released while the suction surfaces AS face upward, as shown in FIG. 5, the suction members AM may take on further contracted shapes in the Z-direction. Such shapes may be referred to as "contracted shapes" below. Deformation of the suction member AM into the contracted shape ensures that the workpiece 2 can be moved by gravity backward in the Z-direction, and therefore the first surface 21 of the workpiece 2 can reliably abut against the first abutting surfaces 11S of the robot hand RH. Positioning of the workpiece 2 in the Z-direction is finished in this way. In particular, the suction members AM of the present example can be deformed into the contracted shape due to their own weight when the suction surfaces AS face upward in the gravity direction. As will be understood from a comparison of FIG. 3 and FIG. 5, the suction members AM of the present example can be deformed into elongated shapes where the suction surfaces AM are located in front of the first abutting surface 11S in the Z-direction (see FIG. 3), and into contracted shapes where the suction surfaces AM are located in back of the first abutting surface 11S in the Z-direction (see FIG. 5).

Further, as shown in FIG. 5, if the suctioning of the workpiece 2 is released while the suction surfaces AS face upward in the gravity direction, the suction members AM are deformed into the above contracted shapes, and the suction surfaces AS are detached from the first surface 21 of the workpiece 2. This ensures that the workpiece 2 can slide on the first abutting surfaces 11S in the X-direction and Y-direction, and therefore it is possible to make the second surface 22 and third surface 23 of the workpiece 2 abut against the first abutting surfaces 12S and third abutting surfaces 13S respectively by suitably slanting the first surface 21 of the workpiece 2 from the horizontal direction. Positioning of the workpiece 2 in the X-direction and Y-direction is finished in this way (see FIG. 9 and FIG. 10 as well).

Figure 6:
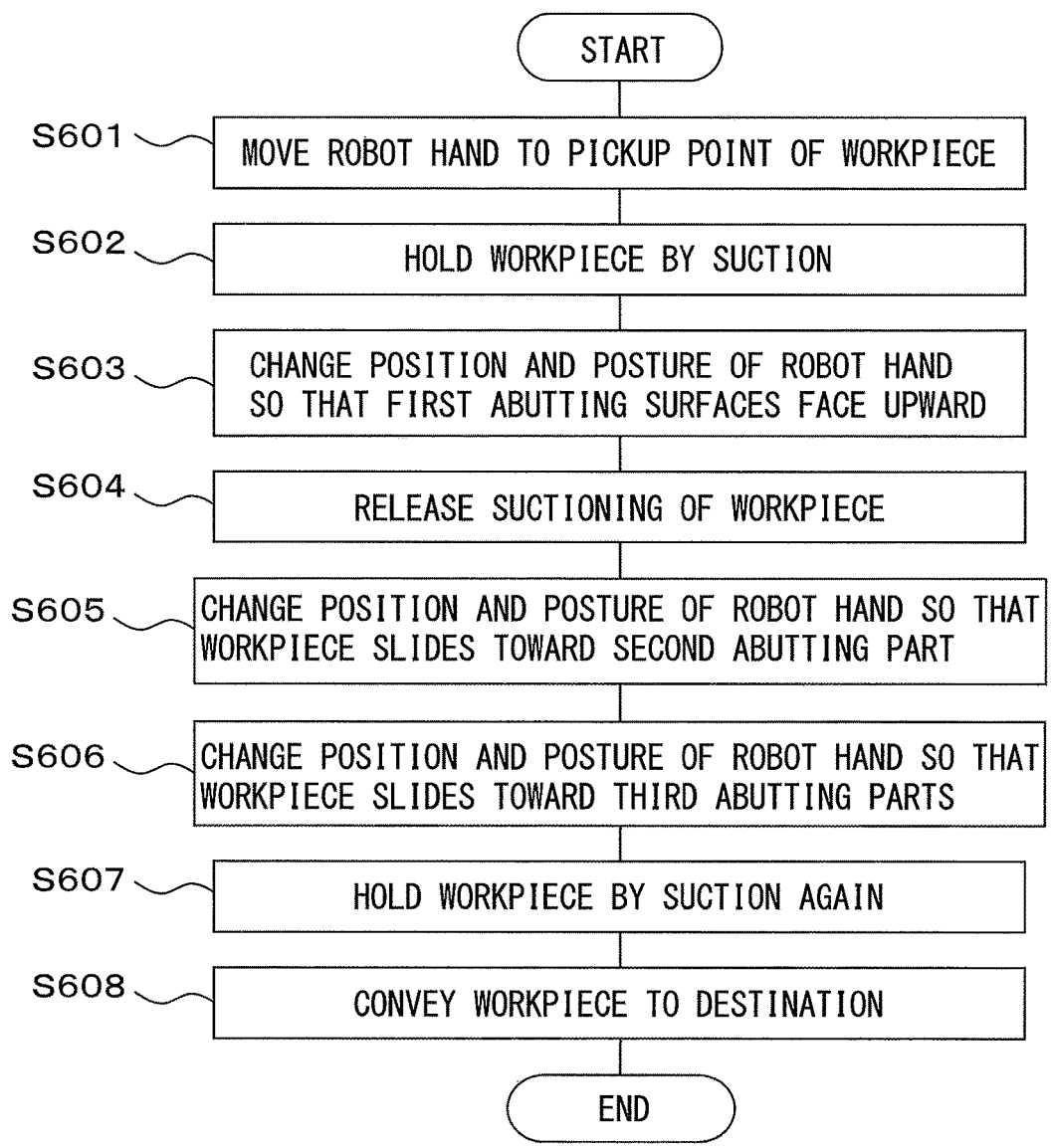
FIG. 6 is a flowchart which shows a procedure of a method of conveying a workpiece by the robot system of FIG. 1.
Figure 7:
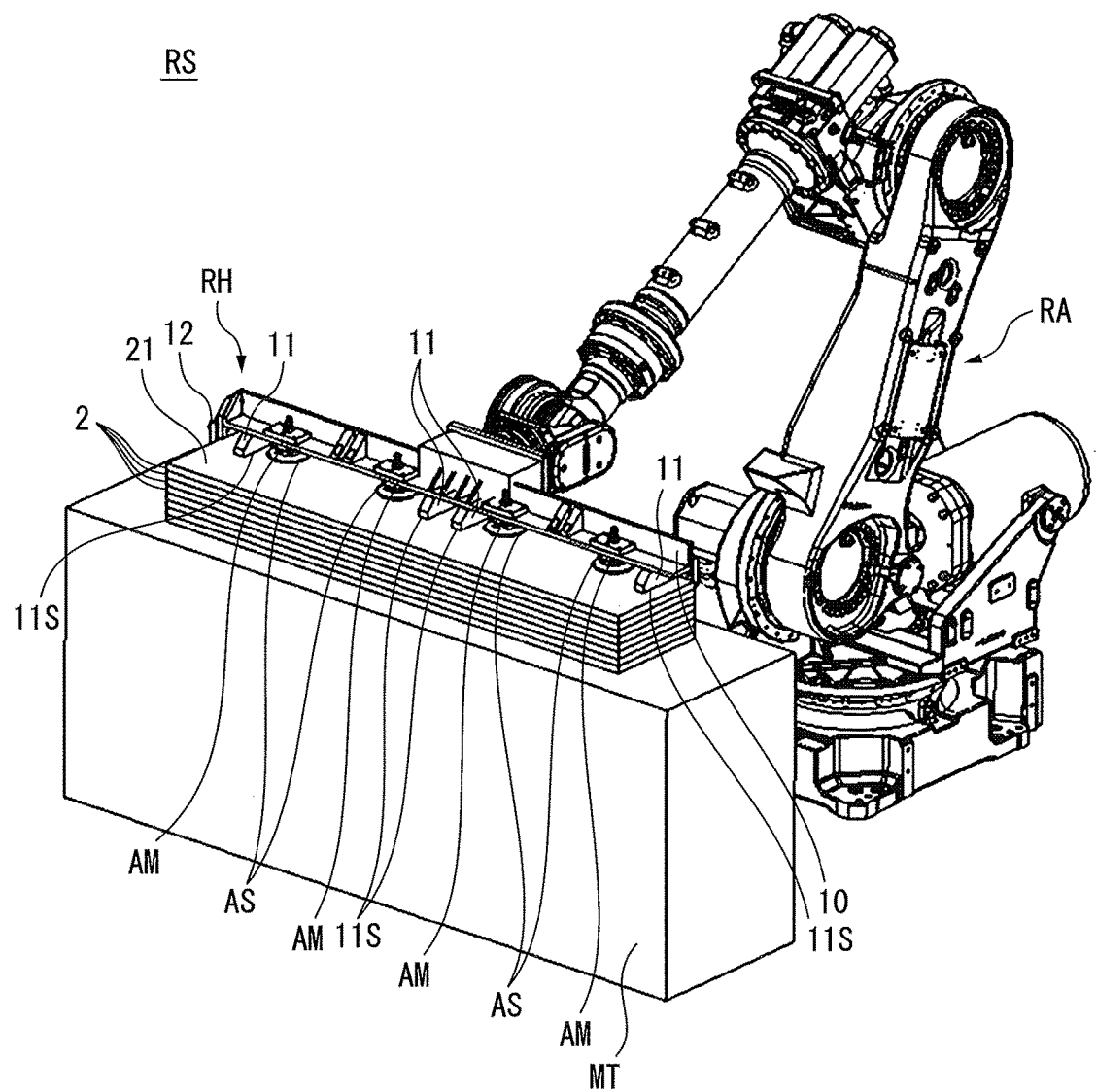
FIG. 7 is a perspective view of a robot system right after step S601 in the flowchart of FIG. 6.

Next, the method of conveying the workpiece 2 by the robot system RS comprising the robot hand RH of the present embodiment will be explained. FIG. 6 is a flowchart which shows the procedure of the method of conveying the workpiece 2 by the robot system RS of FIG. 1. As shown in FIG. 6, first, at step S601, the robot hand RH is moved up to the vicinity of the mounting table MT which serves as a pickup point of the workpiece 2, by means of the robot arm RA. FIG. 7 is a perspective view of a robot system RS right after step S601. As shown in FIG. 7, in the conveying method of the present example, each workpiece 2 is placed on the mounting table MT so that the first surface 21 faces upward in the gravity direction. At step S601, the position and posture of the robot hand RH are changed so that the first abutting surfaces 11S, second abutting surface 12S, and third abutting surfaces 13S of the robot hand RH face the first surface 21, second surface 22, and third surface 23 of the workpiece 2 respectively, and the suction surfaces AS of the robot hand RH contact the first surface 21 of the workpiece 2. During that step, the suction members AM of the robot hand RH may be deformed into the above elongated shapes due to their own weight (see FIG. 3). This can prevent the suction operations of the workpiece 2 by the suction members AM from being obstructed by the first abutting parts 11.

Figure 8:
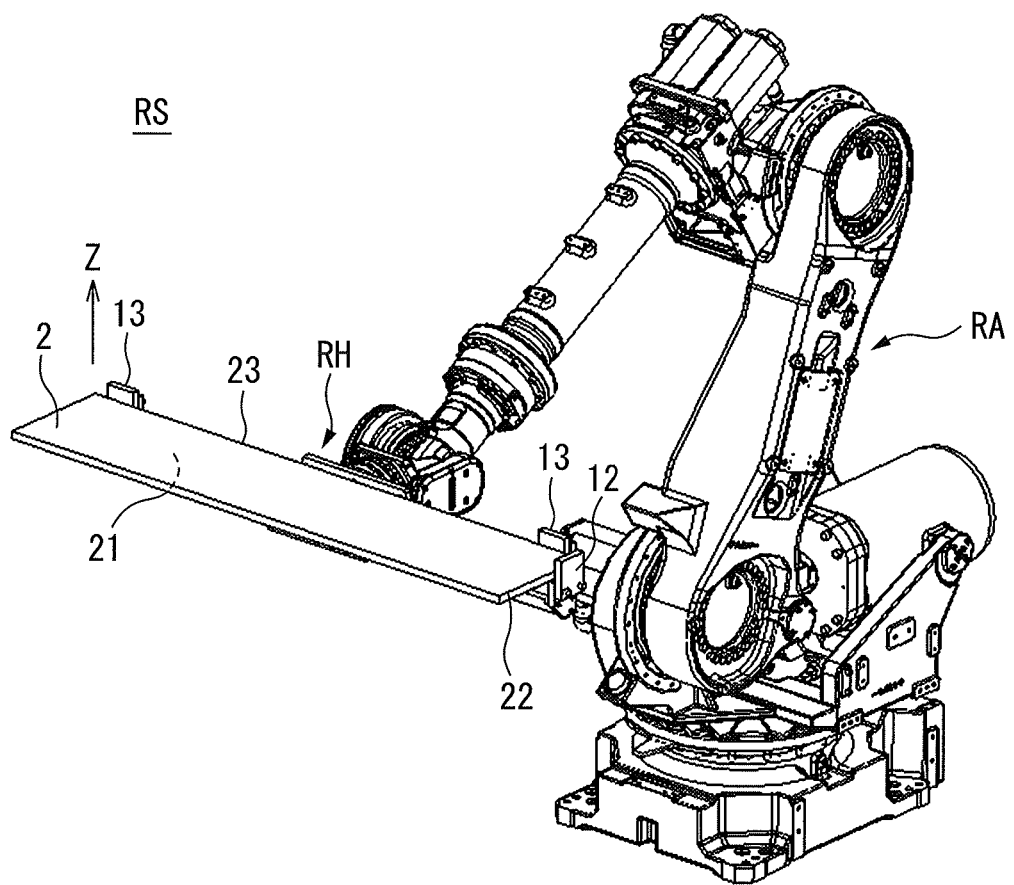
FIG. 8 is a perspective view of a robot system right after step S603 in the flowchart of FIG. 6.

Next, at step S602, the workpiece 2 is held by the suction members AM (see FIG. 4). Next, at step S603, the position and posture of the robot hand RH are changed by the robot arm RA so that the first abutting surfaces 11S face upward in the gravity direction. FIG. 8 is a perspective view of the robot system RS right after step S603. As shown in FIG. 8, at step S603, the first surface 21 of the workpiece 2 is made to face downward in the gravity direction, and therefore the workpiece 2 can slide backward in the Z-direction by gravity. This ensures that the first surface 21 of the workpiece 2 can abut against the first abutting surfaces 11S of the robot hand RH (see FIG. 5). Positioning of the workpiece 2 in the Z-direction is finished in this way. Next, at step S604, the suctioning of the workpiece 2 by the suction members AM is released. During that step, the suction members AM of the robot hand RH can be deformed into the above contracted shape due to their own weight (see FIG. 5). This prevents the sliding motion of the workpiece 2 on the first abutting surface 11S from being obstructed by the suction members AM.

Figure 9:
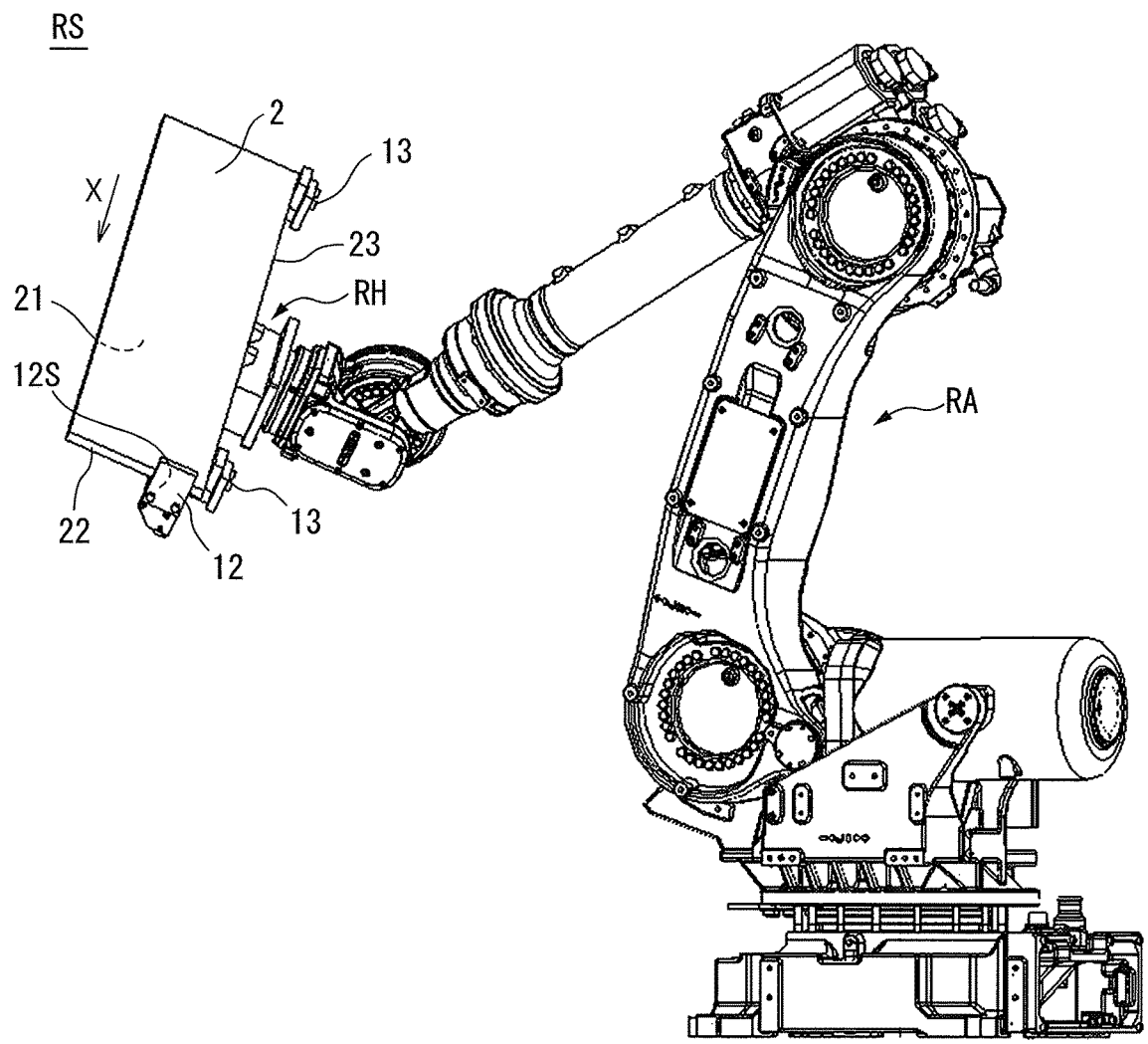
FIG. 9 is a perspective view of a robot system right after step S605 in the flowchart of FIG. 6.

Next, at step S605, the position and posture of the robot hand RH are further changed by the robot arm RA so that the workpiece 2 slides toward the second abutting part 12 on the first abutting surface 11S. FIG. 9 is a perspective view of the robot system RS right after step S605. As shown in FIG. 9, at step S605, the first surface 21 of the workpiece 2 is slanted with respect to the horizontal direction so that the second surface 22 of the workpiece 2 faces obliquely downward in the gravity direction. This ensures that the workpiece 2 can slide by gravity on the first abutting surfaces 11S in the X-direction, and the second surface 22 of the workpiece 2 can abut against the second abutting surface 12S. Positioning of the workpiece 2 in the X-direction is finished in this way. Once positioning of the workpiece 2 in the X-direction is finished, the robot hand RH is returned to the position and posture of the state of FIG. 8.

Figure 10:
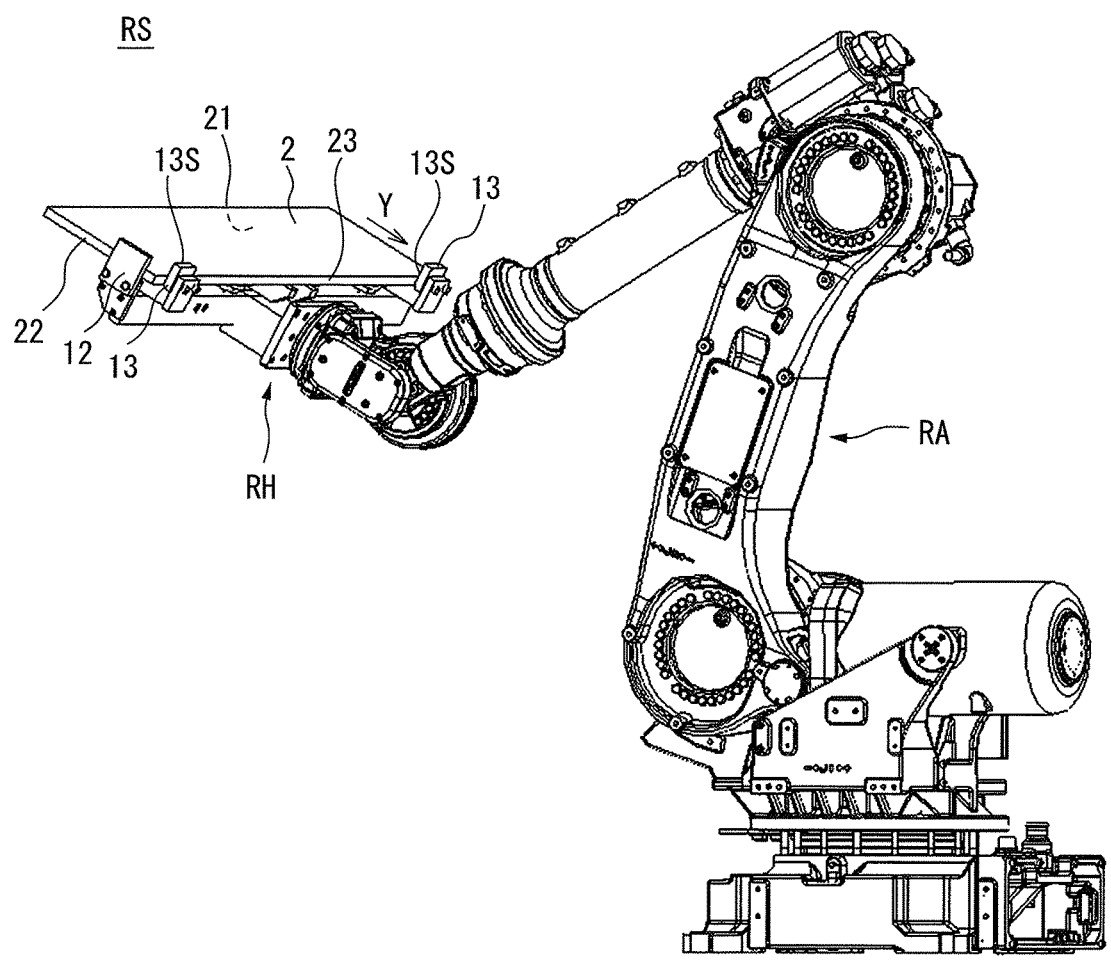
FIG. 10 is a perspective view of a robot system right after step S606 in the flowchart of FIG. 6.

Next, at step S606, the position and posture of the robot hand RH are further changed by the robot arm RA so that the workpiece 2 slides toward the third abutting parts 13 on the first abutting surface 11S. FIG. 10 is a perspective view of a robot system RS right after step S606. As shown in FIG. 10, at step S606, the first surface 21 of the workpiece 2 is slanted with respect to the horizontal direction so that the third surface 23 of the workpiece 2 faces obliquely downward in the gravity direction. This ensures that the workpiece 2 can slide by gravity on the first abutting surfaces 11S in the Y-direction, and the third surface 23 of the workpiece 2 can abut against the third abutting surface 13S. Positioning of the workpiece 2 in the Y-direction is finished in this way.

Next, at step S607, the workpiece 2 after being positioned in three directions is again held by the suction members AM. More specifically, at step S607, high vacuum states are formed inside of the suction members AM, and the suction members AM are forced to elongate in the Z-direction due to the suction effects caused by the vacuum states. As a result, the suction surfaces AS contact the first surface 21 of the workpiece 2, and the workpiece 2 is held by the suction members AM. Next, at step S608, the workpiece 2 being held by the suction members AM is conveyed to a predetermined destination. Conveyance of the workpiece 2 by the robot system RS is finished in this way. As explained above, according to the conveying method of the present example, it is possible to make the first surface 21, second surface 22, and third surface 23 abut against the first abutting surfaces 11S, second abutting surface 12S, and third abutting surfaces 13S respectively without applying an external force to the workpiece 2, and therefore it is possible to accurately position and grip a workpiece 2 without causing a deformation in the workpiece.

Figure 11:
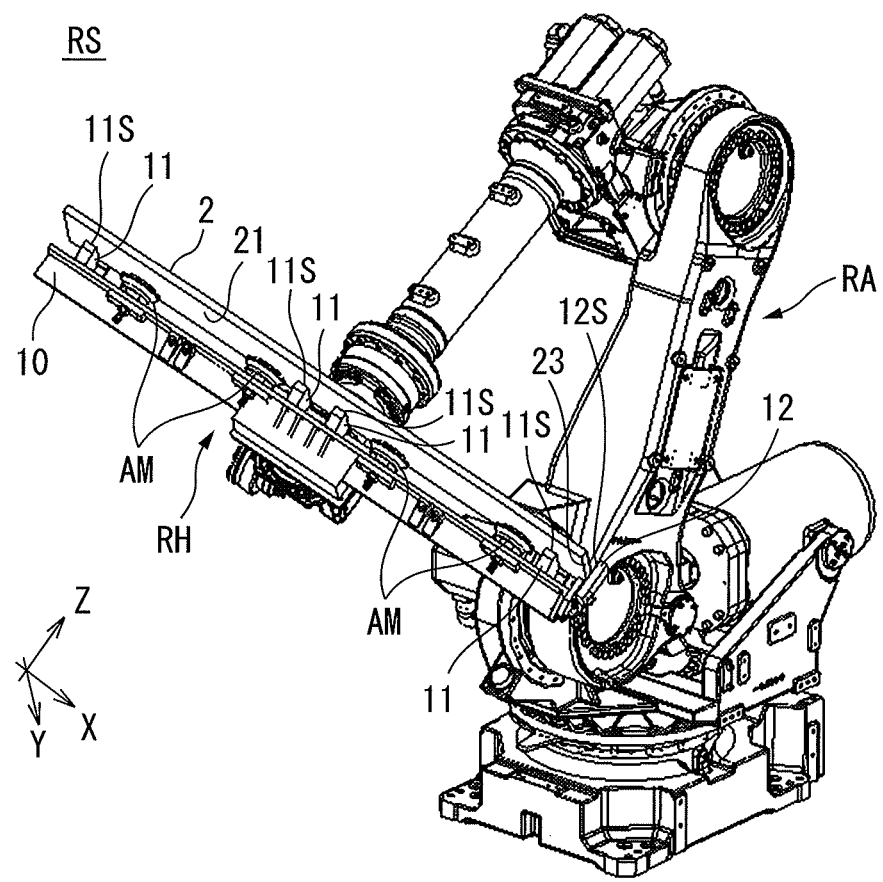
FIG. 11 is a perspective view which shows a position and posture of a robot hand for enabling simultaneous positioning of a workpiece in different directions.

The present invention is not limited to only the above embodiments and can be modified in various ways within the scope described in the claims. For example, in the positioning and gripping method which is illustrated in FIG. 6 to FIG. 10, positioning of the workpiece 2 in different directions takes places as separate steps (i.e. steps S603, S605, S606), but in the positioning and gripping method of the present invention, positioning of the workpiece 2 in different directions may also take place as a single step. FIG. 11 is a perspective view which shows one example of the position and posture of a robot hand RH for enabling simultaneous positioning of a workpiece 2 in different directions. Further, FIG. 12 is a perspective view of the robot hand RH in FIG. 11 as seen from another angle.

Figure 12:
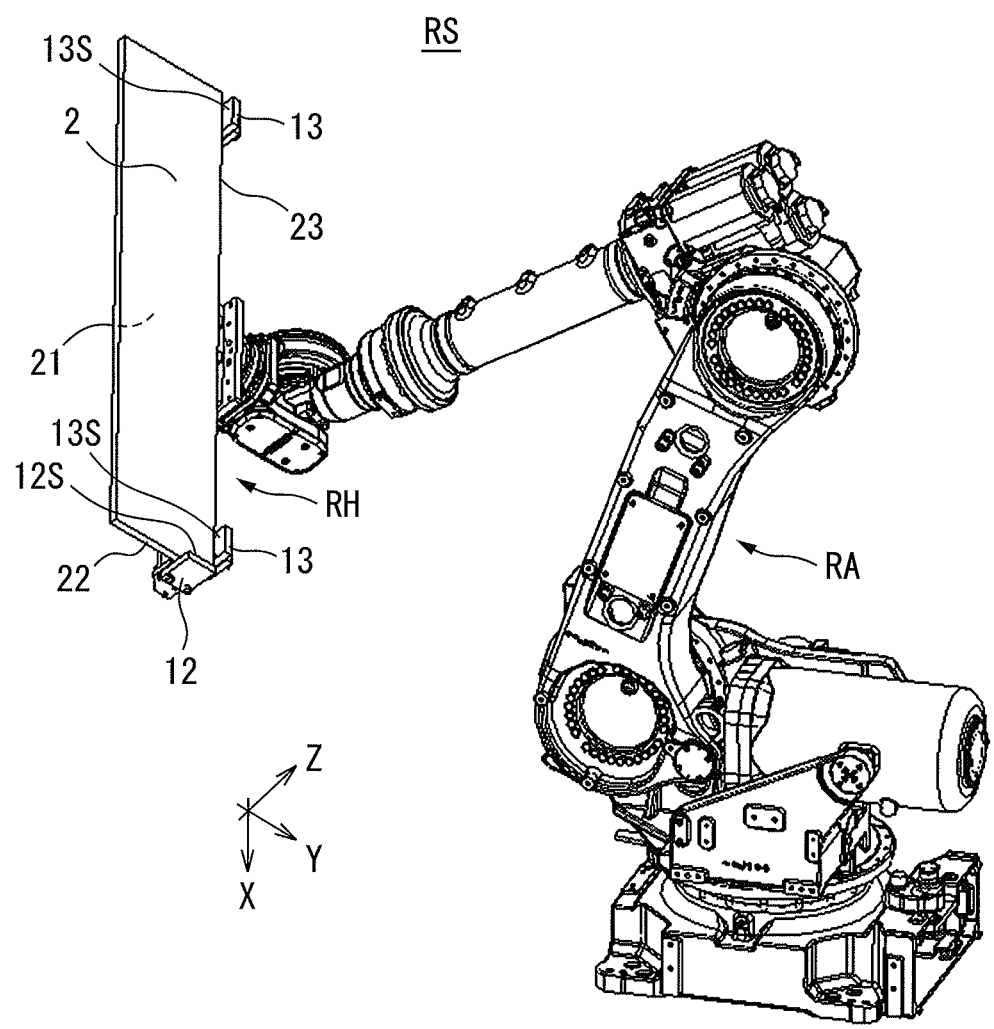
FIG. 12 is a perspective view of a robot hand in FIG. 11 as seen from another angle.

In the positioning and gripping method according to the present example, once the robot hand RH holds the workpiece 2 by suction, the robot arm RA immediately changes the position and posture of the robot hand RH as shown in FIG. 11 and FIG. 12 instead of serially changing them as shown in FIG. 8, FIG. 9, and FIG. 10. As will be understood from FIG. 11 and FIG. 12, in the present example, the position and posture of the robot hand RH are changed so that all of the first surface 21, second surface 22, and third surface 23 of the workpiece 2 face obliquely downward in the gravity direction. This ensures that the second surface 22 and third surface 23 of the workpiece 2 slide in the X-direction and Y-direction toward the second abutting surface 12S and third abutting surfaces 13S respectively, at the same time as the first surface 21 of the workpiece 2 moves backward in the Z direction toward the first abutting surfaces 11S. Therefore, according to the positioning and gripping method according to the present example, it is possible to simultaneously position the workpiece 2 in the different directions and hence possible to shorten the cycle time for conveying the workpiece 2.

Effect of Invention

According to the first, third, and fourth aspects of the present invention, it is possible to make the first surface of the workpiece abut against the first abutting surfaces by making workpiece drop down due to gravity acting thereon, and make the second surface and third surface of the workpiece abut against the second abutting surface and third abutting surfaces respectively by making the workpiece slide on the first abutting surface. In this way, according to the first, third, and fourth aspects of the present invention, it is possible to make the first to third surfaces abut against the first to third abutting surfaces of the robot hand respectively, without applying an external force to the workpiece, and therefore it is possible to accurately position and grip a workpiece without causing a deformation in the workpiece.

According to the second aspect of the present invention, the suction member can be deformed due to its own weight into an elongated shape and contracted shape, and therefore it is possible to prevent the suction operation by the suction member from being obstructed by the first abutting parts, and prevent the sliding motion of the workpiece on the first abutting surfaces from being obstructed by the suction members.

The invention claimed is:

1. A suction-type robot hand for gripping a workpiece which has a mutually intersecting first surface, second surface, and third surface, comprising:
   a main body part;
   a first static abutting part which projects from the main body part in a projecting direction, and has a first abutting surface against which the first surface of the workpiece physically abuts;
   a second static abutting part which extends from the main body part in the projecting direction, and against which the second surface of the workpiece physically abuts;
   a third static abutting part which extends from the main body part in the projecting direction, and against which the third surface of the workpiece physically abuts; and
   a suction member attached to the main body part, and having a suction surface which physically abuts and holds by suction the first surface of the workpiece,
   wherein the suction member projects from the main body part in the projecting direction, and
   wherein the suction member is deformable into an elongated shape in the projecting direction when suction is not applied to the suction member, and into a contracted shape in the projecting direction when suction is applied to the suction member, the contracted shape in the projecting direction physically limited by the first static abutting part.

2. The robot hand according to claim 1, wherein when said suction surface faces downward in the gravity direction, said suction member is deformed into said elongated shape due to its own weight, and when said suction surface faces upward in the gravity direction, said suction member is deformed into said contracted shape due to its own weight.

3. A robot system comprising a robot hand according to claim 1, and a robot arm which can change a position and posture of said robot hand.

4. A method of positioning and gripping said workpiece with respect to said robot hand in the robot system according to claim 3, comprising:

holding by said suction member, said first surface of said workpiece which faces upward in the gravity direction, changing a position and posture of said robot hand which holds by suction said workpiece, so that said first surface faces downward in the gravity direction, and thereby making said workpiece drop down by gravity so that said first surface abuts against said first abutting surface, releasing suctioning of said workpiece by said suction member, further changing a position and posture of said robot hand so that said first abutting surface becomes slanted with respect to the horizontal direction, and thereby making said workpiece slide by gravity along said first abutting surface so that said second surface and said third surface abut against said second static abutting part and said third static abutting part respectively, and again holding by said suction member, said first surface of said workpiece in the state where said second surface and said third surface abut against said second static abutting part and said third static abutting part respectively.

* * * * *